(12) United States Patent
Vidos et al.

(10) Patent No.: US 9,424,563 B2
(45) Date of Patent: Aug. 23, 2016

(54) ACCESSING MEDIAL CONTEXT INFORMATION USING CONTEXTUAL LINKS

(75) Inventors: Hugh Christopher Vidos, Sammamish, WA (US); Dean Wayne Talley, Issaquah, WA (US); David Ethan Zoller, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1331 days.

(21) Appl. No.: 11/078,086

(22) Filed: Mar. 11, 2005

(65) Prior Publication Data

US 2006/0206428 A1 Sep. 14, 2006

(51) Int. Cl.
| | | |
|---|---|---|
| G06Q 20/00 | (2012.01) | |
| G06Q 20/12 | (2012.01) | |
| H04N 21/4143 | (2011.01) | |
| H04N 21/482 | (2011.01) | |
| G06F 3/0482 | (2013.01) | |
| G06F 3/0484 | (2013.01) | |
| G06F 3/16 | (2006.01) | |
| G06F 17/22 | (2006.01) | |
| H04N 21/443 | (2011.01) | |

(52) U.S. Cl.
CPC .......... *G06Q 20/1235* (2013.01); *G06F 3/0482* (2013.01); *G06F 3/04842* (2013.01); *G06F 3/165* (2013.01); *G06F 17/2235* (2013.01); *G06Q 20/123* (2013.01); *H04N 21/4143* (2013.01); *H04N 21/4825* (2013.01); *H04N 21/4431* (2013.01)

(58) Field of Classification Search
None
See application file for complete search history.

(56) References Cited

U.S. PATENT DOCUMENTS

| | | |
|---|---|---|
| 5,528,260 A | 6/1996 | Kent |
| 5,749,081 A | 5/1998 | Whiteis |
| 5,754,939 A | 5/1998 | Herz et al. |
| 5,986,673 A | 11/1999 | Martz |

(Continued)

FOREIGN PATENT DOCUMENTS

| | | |
|---|---|---|
| JP | 11219365 | 8/1999 |
| JP | 2001350793 | 12/2001 |

(Continued)

OTHER PUBLICATIONS

Wong, Clinton, Web Client Programming with Perl. Mar. 1997; O'Reilly & Asscoiates, Inc. pp. 27-38.*

(Continued)

*Primary Examiner* — Mohammad A Nilforoush
(74) *Attorney, Agent, or Firm* — Aaron Chatterjee; Judy Yee; Micky Minhas

(57) ABSTRACT

The systems and methods described herein are directed toward launching a third party application in a media center module using a contextual link. The media center module is configured to enable the third party application to register with the module and to associate a contextual link corresponding to the third party application with a context provided by the media center module. In response to a request for information related to the context, the media center module is configured to direct to a location associated with the contextual link. The media center module is further configured to provide to the location data that identifies the context. In response to the provided data, the location is populated with the requested information. Thus, the use of conditional link enables a third party application to register to be a context handler for a media center module.

20 Claims, 6 Drawing Sheets

(56) References Cited

U.S. PATENT DOCUMENTS

| | | | |
|---|---|---|---|
| 6,029,195 | A | 2/2000 | Herz |
| 6,085,186 | A * | 7/2000 | Christianson et al. ............ 707/3 |
| 6,097,389 | A | 8/2000 | Morris et al. |
| 6,108,004 | A | 8/2000 | Medl |
| 6,199,082 | B1 | 3/2001 | Ferrel et al. |
| 6,226,618 | B1 | 5/2001 | Downs et al. |
| 6,246,793 | B1 | 6/2001 | Rindtorff et al. |
| 6,345,256 | B1 | 2/2002 | Milsted et al. |
| 6,345,293 | B1 | 2/2002 | Chaddha |
| 6,438,579 | B1 | 8/2002 | Hosken |
| 6,452,609 | B1 | 9/2002 | Katinsky et al. |
| 6,545,209 | B1 | 4/2003 | Flannery et al. |
| 6,546,405 | B2 | 4/2003 | Gupta et al. |
| 6,557,042 | B1 | 4/2003 | He et al. |
| 6,564,260 | B1 | 5/2003 | Baber et al. |
| 6,564,263 | B1 | 5/2003 | Bergman et al. |
| 6,578,040 | B1 | 6/2003 | Syeda-Mahmood |
| 6,801,229 | B1 | 10/2004 | Tinkler |
| 6,829,615 | B2 | 12/2004 | Schirmer et al. |
| 6,850,954 | B2 | 2/2005 | Kawamae et al. |
| 6,868,525 | B1 | 3/2005 | Szabo |
| 6,920,448 | B2 * | 7/2005 | Kincaid et al. .................... 707/3 |
| 6,934,917 | B2 | 8/2005 | Lin |
| 7,076,736 | B2 | 7/2006 | Hugh |
| 7,120,619 | B2 | 10/2006 | Drucker et al. |
| 7,127,500 | B1 * | 10/2006 | Hellman et al. ............ 709/219 |
| 7,131,059 | B2 | 10/2006 | Obrador |
| 7,149,755 | B2 | 12/2006 | Obrador |
| 7,177,650 | B1 | 2/2007 | Reiger et al. |
| 7,194,527 | B2 | 3/2007 | Drucker et al. |
| 7,610,394 | B2 | 10/2009 | Katinsky et al. |
| 7,689,525 | B2 | 3/2010 | Drucker et al. |
| 7,769,832 | B2 | 8/2010 | Drucker et al. |
| 7,783,979 | B1 | 8/2010 | Leblang et al. |
| 2002/0026478 | A1 | 2/2002 | Rodgers et al. |
| 2002/0049679 | A1 * | 4/2002 | Russell et al. ................... 705/52 |
| 2002/0107853 | A1 | 8/2002 | Hofmann et al. |
| 2003/0093329 | A1 | 5/2003 | Gutta |
| 2003/0177111 | A1 * | 9/2003 | Egendorf et al. ................. 707/3 |
| 2003/0188263 | A1 * | 10/2003 | Bates et al. .................... 715/513 |
| 2003/0233645 | A1 | 12/2003 | Cohen et al. |
| 2004/0019608 | A1 | 1/2004 | Obrador |
| 2004/0113954 | A1 | 6/2004 | Newman |
| 2004/0128308 | A1 | 7/2004 | Obrador |
| 2005/0022237 | A1 | 1/2005 | Nomura |
| 2005/0160014 | A1 * | 7/2005 | Moss et al. ....................... 705/26 |
| 2006/0206799 | A1 | 9/2006 | Vidos et al. |
| 2016/0026610 | A1 | 1/2016 | Vidos et al. |

FOREIGN PATENT DOCUMENTS

| | | |
|---|---|---|
| JP | 2002108936 | 4/2002 |
| WO | WO02065339 | 8/2002 |

OTHER PUBLICATIONS

Lowe, Doug et al.; "Internet Explorer 3 for Windows for Dummies"; 1996; IDG Books Worldwide, Inc.; pp. 42-43.

Xie, Xing et al.; "Enabling Personalization Services on the Edge"; ACM; 2002.

El Saddik, Abdulmotaleb, et al.; "Metadata for Smart Multimedia Learning Objects"; ACM; 2000.

Kurki, Teppo, et al.; "Agents in Delivering Personalized Content Based on Semantic Metadata"; American Association for Artificial Intelligence; 1998.

Dorai, Chitra et al.; "Bridging the Semantic Gap in Content Management Systems: Computational Media Aesthetics"; 2001, 6 pages.

Phelps, Thomas A. et al.; "The Multivalent Browser: A Platform for New Ideas"; Proceedings of the 2001 ACM Symposium on Document Engineering; Nov. 2001; pp. 58-67.

Witten, Ian H., et al.; "Greenstone: A Comprehensive Open-Source Digital Library Software System"; *Proceedings of the 5th ACM Conference on Digital Libraries*; 1999; 9 pages.

Tandianus, Jeff E. et al.; "Video Cataloguing and Browsing"; Pan-Sydney Area Workshop on Visual Information Processing; *Conferences in Research and Practice in Information Technology*; vol. 11; Sydney, Australia; 2002; 7 pages.

"Sixth Office Action in China Patent Application No. 200480013921.6", Mailed Date: Oct. 29, 2013, Filed Date: Mar. 26, 2004, 6 pages.

Response to the "Sixth Office Action in China Patent Application No. 200480013921.6", Mailed Date: Jan. 8, 2014, Filed Date: Mar. 26, 2004, 17 pages.

Non-Final Office Action, From U.S. Appl. No. 10/174,212, filed Jun. 18, 2002, Mailed: Jun. 16, 2005.

Response to the Jun. 16, 2005 Non-Final Office Action, From U.S. Appl. No. 10/174,212, filed Jun. 18, 2002 Sep. 20, 2005.

Final Office Action, From U.S. Appl. No. 10/174,212, Mailed Dec. 8, 2005.

Response to the Dec. 8, 2005 Final Office Action, From U.S. Appl. No. 10/174,212, filed Jun. 18, 2002 Sep. 20, 2005.

Non-Final Office Action, From U.S. Appl. No. 11/539,963, filed Oct. 10, 2006, Mailed: Oct. 8, 2009.

Response to the Oct. 8, 2009 Non-Final Office Action, From U.S. Appl. No. 11/539,963, filed Feb. 5, 2010.

Non-Final Office Action, From U.S. Appl. No. 10/420,414, filed Apr. 22, 2003, Mailed: Jan. 20, 2006.

Response to the Jan. 20, 2006 Non-Final Office Action, From U.S. Appl. No. 10/420,414, filed Apr. 21, 2006.

Response Filed Mar. 2, 2015 to the Non-Final Office Action Mailed Oct. 1, 2014 From U.S. Appl. No. 11/077,608, 10 Pages.

Final Office Action Mailed Apr. 9, 2015 from U.S. Appl. No. 11/077,608, 14 Pages.

Notice of Allowance Mailed Jun. 6, 2014 From China Patent Application No. 200480013921.6, 14 Pages.

Response Filed Jul. 25, 2011 to Office Action Mailed Dec. 10, 2010 From Korea Patent Application No. 10-2005-7019989, 44 Pages.

Non-Final Office Action Mailed Jul. 18, 2008 From U.S. Appl. No. 11/537,763, 25 Pages.

Response Filed Oct. 10, 2008 to Final Office Action Mailed Jul. 18, 2008 From U.S. Appl. No. 11/537,763, 9 Pages.

Final Office Action Mailed Dec. 9, 2008 From U.S. Appl. No. 11/537,763, 18 Pages.

Response Filed Jan. 13, 2009 to Final Office Action Mailed Dec. 9, 2008 From U.S. Appl. No. 11/537,763, 9 Pages.

Advisory Action Mailed Jan. 27, 2009 From U.S. Appl. No. 11/537,763, 4 Pages.

Non-Final Office Action Mailed Apr. 3, 2009 From U.S. Appl. No. 11/537,763, 19 Pages.

Response filed Jul. 6, 2009 to Non-Final Office Action Mailed Apr. 3, 2009 From U.S. Appl. No. 11/537,763, 13 Pages.

Final Rejection Mailed Oct. 16, 2009 From U.S. Appl. No. 11/537,763, 20 Pages.

Response filed Dec. 11, 2009 to Final Rejection Mailed Oct. 16, 2009 From U.S. Appl. No. 11/537,763, 18 Pages.

Notice of Allowance Mailed Dec. 30, 2009 From U.S. Appl. No. 11/537,763, 12 Pages.

Notice of Allowance Mailed Feb. 25, 2010 From U.S. Appl. No. 11/537,763, 6 Pages.

International Search Report Dated Jun. 22, 2007 for PCT Patent Application Serial No. PCT/US04/09190, 4 Pages.

Terminal Disclaimer Filed Feb. 5, 2010 From U.S. Appl. No. 11/539,963, 1 Page.

Notice of Allowance Mailed Apr. 29, 2010 From U.S. Appl. No. 11/539,963, 14 Pages.

Notice of Allowance Mailed Jul. 6, 2006 From U.S. Appl. No. 10/420,414, 9 Pages.

Notice of Allowance Mailed Jan. 31, 2011 From Taiwan Patent Application No. 93108430, 4 Pages.

European Supplementary Search Report Mailed Jul. 23, 2009 From European Patent Application No. 04759762.0, 2 Pages.

Office Action Mailed Oct. 14, 2009 From European Patent Application No. 04759762.0, 8 Pages.

Response Filed Jan. 29, 2010 to the Office Action Mailed Oct. 14, 2009 From European Patent Application No. 04759762.0, 23 Pages.

Decision to Refuse Mailed Sep. 4, 2012 From European Patent Application No. 04759762.0, 4 Pages.

(56) References Cited

OTHER PUBLICATIONS

Office Action Mailed Sep. 15, 2009 From Japan Patent Application No. 2006-509303, 11 Pages.
Response Filed Dec. 15, 2009 to the Office Action Mailed Sep. 15, 2009 From Japan Patent Application No. 2006-509303, 17 Pages.
Final Office Action Mailed Mar. 26, 2010 From Japan Patent Application No. 2006-509303, 9 Pages.
Office Action Mailed Dec. 5, 2008 From China Patent Application No. 200480013921.6, 35 Pages.
Response Filed Feb. 27, 2009 to the Office Action Mailed Dec. 5, 2008 From China Patent Application No. 200480013921.6, 24 Pages.
Office Action Mailed Apr. 24, 2009 From China Patent Application No. 200480013921.6, 15 Pages.
Response Filed Jun. 30, 2009 to the Office Action Mailed Apr. 24, 2009 From China Patent Application No. 200480013921.6, 24 Pages.
Office Action Mailed Oct. 16, 2009 From China Patent Application No. 200480013921.6, 8 Pages.
Office Action Mailed Jan. 22, 2010 From China Patent Application No. 200480013921.6, 16 Pages.
Response Filed Mar. 31, 2010 to the Office Action Mailed Jan. 22, 2010 From China Patent Application No. 200480013921.6, 22 Pages.
Final Office Action Mailed Sep. 13, 2010 From China Patent Application No. 200480013921.6, 13 Pages.
Response Filed Oct. 12, 2012 to the Notice on Reexamination Mailed Aug. 30, 2012 From China Patent Application No. 200480013921.6, 17 Pages.
Decision on Reexamination Mailed Mar. 12, 2013 From China Patent Application No. 200480013921.6, 17 Pages.
Office Action Mailed Jun. 27, 2013 From China Patent Application No. 200480013921.6, 8 Pages.
Response Filed Jul. 10, 2013 to the Office Action Mailed Jun. 27, 2013 From China Patent Application No. 200480013921.6, 24 Pages.
Request for Examination and Voluntary Amendment Filed Mar. 3, 2009 From Korea Patent Application No. 10-2005-7019989, 5 Pages.
Response Filed Nov. 29, 2010 to the Office Action Mailed Sep. 27, 2010 from Korea Patent Application No. 10-2005-7019989, 43 Pages.
Office Action Mailed Jun. 29, 2011 From Korea Patent Application No. 10-2005-7019989, 7 Pages.
Office Action Mailed Jan. 22, 2008 From India Patent Application No. 4828/DELNP/2005, 7 Pages.
Response Filed Jan. 9, 2009 to the Office Action Mailed Jan. 22, 2008 From India Patent Application No. 4828/DELNP/2005, 9 Pages.
Terminal Disclaimer Filed Oct. 10, 2008 From U.S. Appl. No. 11/537,763, 1 Page.
Response and Request for Consideration Under the After Final Consideration Pilot Program 2.0 Filed Jul. 9, 2015 to the Final Office Action Mailed Apr. 9, 2015 From U.S. Appl. No. 11/077,608, 10 Pages.
Advisory Action, Examiner Initiated Interview Summary and After Final Consideration Decision Mailed Jul. 30, 2015 From U.S. Appl. No. 11/077,608, 6 Pages.
Response Filed Aug. 10, 2015 to the Final Office Action Mailed Apr. 9, 2015 From U.S. Appl. No. 11/077,608, 9 Pages.
Non-Final Office Action Mailed Oct. 1, 2014 From U.S. Appl. No. 11/077,608, 16 Pages.
Response Filed Feb. 17, 2011 to the Final Office Mailed Nov. 24, 2010 From U.S. Appl. No. 11/077,608, 12 Pages.
Final Office Action Mailed Nov. 24, 2010 From U.S. Appl. No. 11/077,608, 13 Pages.
Response Filed Aug. 26, 2010 to the Non-Final Office Action Mailed May 26, 2010 From U.S. Appl. No. 11/077,608, 11 Pages.
Non-Final Office Action Mailed May 26, 2010 From U.S. Appl. No. 11/077,608, 12 Pages.
Response Filed Feb. 22, 2010 to the Restriction Requirement Mailed Jan. 21, 2010 from U.S. Appl. No. 11/077,608, 7 Pages.
Restriction Requirement Mailed Jan. 21, 2010 From U.S. Appl. No. 11/077,608, 6 Pages.
Advisory Action Mailed Feb. 1, 2006 From U.S. Appl. No. 10/174,212, 4 Pages.
Appeal Brief Filed May 8, 2006 From U.S. Appl. No. 10/174,212, 16 Pages.
Notice of Allowance Mailed Aug. 1, 2006 From U.S. Appl. No. 10/174,212, 8 Pages.
Preliminary Amendment mailed Sep. 14, 2015 from U.S. Appl. No. 14/851,818, 8 pages.

\* cited by examiner

ACCESSING MEDIAL CONTEXT INFORMATION USING CONTEXTUAL LINKS

CROSS-REFERENCE TO RELATED APPLICATION(S)

This application is related to U.S. Patent Application, No. 11077608, titled "MEDIA SOFTWARE NAVIGATION WITH CONDITIONAL LINKS", the content of which is hereby incorporated by reference.

BACKGROUND

As the popularity of digital media continues to gain momentum, more and more users are using computers as their primary source of media playback. This trend is, in part, driven by the superior versatility of a programmable computing device, as compared to a dedicated, single purpose electronic device, such as a DVD player. For example, a computer may be programmed to playback and view many types of media, such as audio, video, graphics, documents, web content, etc. The extensiveness and diversify of the network and program interfaces found in computers are often essential to gain access to online digital media content. The ability to access the Internet also allows users to obtain enhanced content related to the media from online content providers.

Unfortunately, a conventional computer is typically not as user-friendly as a typical electronic media device. To play media content, the user interface offered by conventional computers often require more effort than pushing one or two buttons on a remote control. Also, users often have to use applications that are provided by third party online providers in order to receive the desire content offered by those providers.

A user-friendly way for third party providers to provide content to computer users without the need for a user to perform extensive setup and monitoring using the providers' applications continue to elude those skilled in the art.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the examples and the sequence of steps for constructing and operating the examples. However, the same or equivalent functions and sequences may be accomplished by different examples.

The systems and methods described herein are directed toward launching a third party application in a media center module using a contextual link. The media center module is configured to enable the third party application to register with the module and to associate a contextual link corresponding to the third party application with a context provided by the media center module. In response to a request for information related to the context, the media center module is configured to direct to a location associated with the contextual link. The media center module is further configured to provide to the location data that identifies the context. In response to the provided data, the location is populated with the requested information. Thus, the use of conditional link enables a third party application to register to be a context handler for a media center module.

Figure 1:
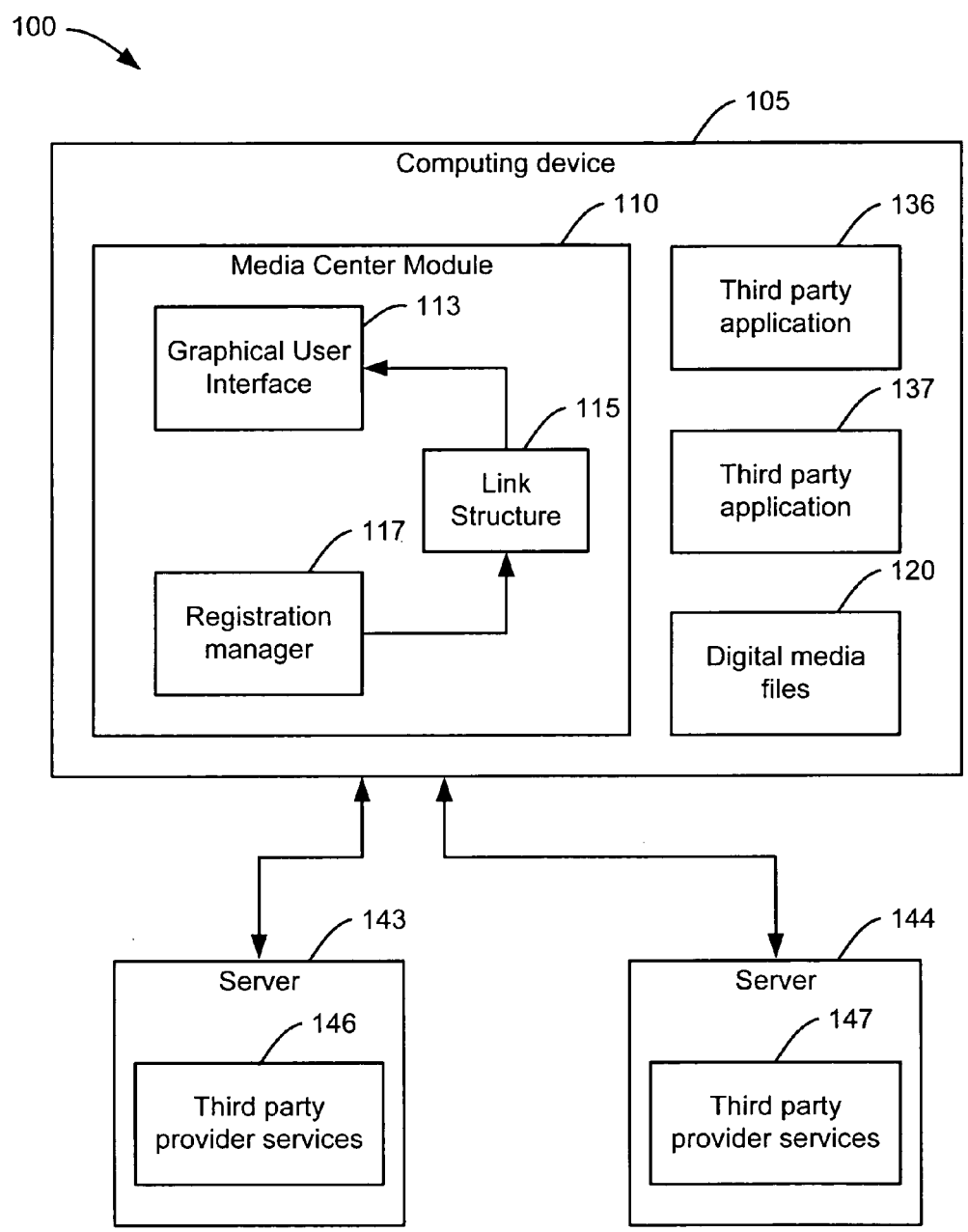
FIG. 1 illustrates an example system for handling digital media content.

FIG. 1 illustrates an example system 100 for handling digital media content. The system 100 may include software modules in computing device 105 and servers 143-144. Computing device 105 includes media center module 110 configured to provide an environment for applications to provide digital media content to computing device 105. Media center module 110 is also configured to manage the applications and the digital media content. For example, media center module 110 may interact with third party applications 136-137, which may be configured to communicate with third-party provider services 146-147 to provide digital media files 120 and other related information.

Media center module 110 may be implemented as an application or a component of the operating system for computing device 105. An example of media center module 110 is WINDOW® XP Media Center Edition. As shown in FIG. 1, media center module 110 may include a graphical user interface 113, link structure 115, and registration manager 117.

The functionalities and third party application associated with media center module 110 are typically organized with link structure 115. Link structure 15 includes multiple links that point to local locations in computing device 105 for media content and applications, such as third party applications 136-137. The links may also point to network locations in other devices, such as server 143-144. Links included in link structure 115 are presented by graphical user interface 113 for selection and may serve as entry points for applications associated with media center module 110. For example, the locations indicated by the links may be associated with data for launching applications that handle media content. Graphical user interface 113 is configured to enable a user to interact with media center module 110. Typically, graphical user interface 113 organizes the functionalities of media center module 110 with links included in link structure 115.

Registration manager 117 is configured to register applications with media center module 110. For example, registration manger 117 may be configured to handle registration for third party applications that are installed on media center module 110, such as third party applications 136-137. In particular, third party applications 136-137 may have entry points that enable a user to access the applications from media center module 110. The entry points are typically represented by links. Registration manager 117 is configured to incorporate these links into link structure 115. Graphical user interface 113 may access link structure 115 to present the links to the user for accessing third party applications 136-137. Typically, link structure 115 includes a primary link for each of the third party applications 136-137. The primary link serves as the main entry point for the corresponding application.

Registration manager 117 may also include a conditional link for a third party application in link structure 115. A conditional link points to a location that is different from the location associated with the primary link for the third party application. A conditional link is typically associated with a condition. When the condition exists, the conditional link replaces the primary link as the main entry point for the third party application. The location associated with the conditional link may serve as a unified place for aggregating asynchronous notifications about new content provided by the third party application.

For example, third party application 136 in media center module 110 may specify a conditional link that points to a page for accessing new content when they are available. Third party application 136 may receive the new content from third party provider services 146. Third party application 136 may notify media center module 110 to use the conditional link as the main entry point when the new content has been downloaded. The media center module 110 may display a message in graphical user interface 113 about the new content. In this manner, a user may be informed of the new content without having to launch third party application 136. Also, the user is automatically directed to a location for accessing the new content when the user selects to launch the third party application. In one embodiment, media center module 110 may include a page dedicated to new content notifications along with conditional links for the third party applications that provide the new content.

Digital media files 120 are digital media content managed by media center module 110. Digital media files 120 may include any type of content, such as video files, audio files, documents, graphics, pictures, web pages, or the like. Media center module 110 may be configured to organize digital media files 120 with the context of the files, such as the artist, album, genre, producer, director, or the like. A user of digital media files 120 may desire to obtain more information about a particular file or find other media content similar to the file. Media center module 110 may be configured to allow third party applications to register as context handlers to provide information to the user in a particular context. For example, link structure 115 may include locations where contextual links associated with each particular context are stored. Media center module 110 may include links of the third party applications registered as context handlers in link structure 115 at locations associated with the registered context.

Media center module 110 may be configured to enable a user who desires contextual information to select and interact with context handlers. For example, if a user chooses a particular song in media center module 110 and selects to find other media content in the same context as the chosen song, media center module 110 may direct the user to the handler for that context. Media center module 110 may provide contextual information of the chosen song to the context handler so that the handler may provide media content related to the context to the user. For example, media center module 110 may provide the contextual information as a HTML Post message to the third party application that is registered to be the context handler.

Figure 2:
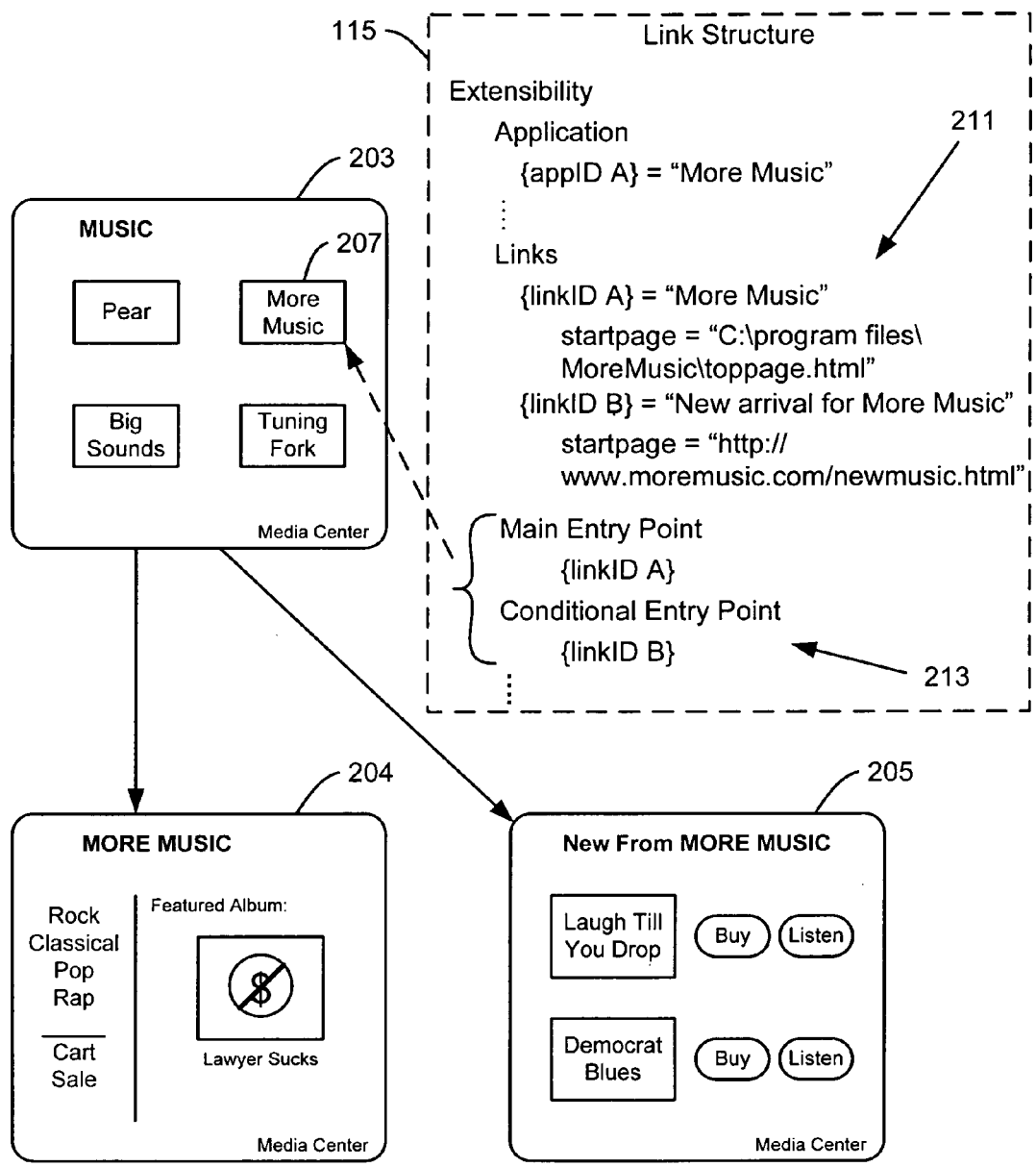
FIG. 2 illustrates an example implementation of a conditional link in the media center module shown in FIG. 1.

FIG. 2 illustrates an example implementation of a conditional link in media center module 110 shown in FIG. 1. In this example, a third party application named More Music is registered with media center module 110. As shown in FIG. 2, link structure 115 includes entries that are associated with More Music. For illustrative purpose, only a few entries in link structure 115 are shown. A third party application may registered with media center module 110 in any manner, such as by communication through an API offered by media center module 110 or by providing a setup file with setup information.

Typically, each application registered with media center module 110 is identified with a global universal identification (GUID) in link structure 115. In FIG. 2, More Music is identified by "appID A". Link structure 115 may also include links 211 associated with More Music. Each of the links 211 may also be identified with a GUID. In this example, two links are included for More Music and are identified as "linkID A" and "linkID B". Each of the links points to a specific location from which program codes associated with More Music can be retrieved for launching the application. The locations associated with the links may be a local location, such as a local file, or a network location, such as an Internet address. In this example, "linkID A" is associated with a local file provided by More Music. The "linkID B" is associated with a web page provided by a More Music network server.

Link structure 115 may also include entry points 213 for More Music. These entry points are provided by More Music to media center module 110 during registration. As shown in FIG. 2, a main entry point and a conditional entry point are included for More Music. The main entry point provides program access to More Music in media center module 110 under normal circumstances. The conditional entry point is an alternative access location for More Music under a certain condition. Typically, media center module 110 provides program access to a user using the main entry point. The application associated with More Music may determine that the certain condition exists and may notify media center module 110 to use the conditional entry point for program access to More Music.

In FIG. 2, example screens of graphical user interface 113 for media center module 110 are shown to illustrate the use of a conditional link. Screen 203 shows a main music page provided by graphical user interface 113. Screen 203 includes multiple entry points for launching third party music programs in media center module 110. One of the entry points is entry point 207 for More Music. The entry point corresponds to the entry points 213 in link structure 115. A user may select entry point 207 to launch an application associated with More Music. Under normal circumstances, media center module 110 is configured to launch More Music with the main entry point associated with "linkID A". In response to the user selection, the graphical user interface 113 displays the main launch screen 204 for More Music. However, if media center module 110 receives a notification from the More Music application to implement the conditional entry point, media center module would launch More Music with the conditional entry point specified in link structure 115. In this example, the conditional entry point is implemented when there is new music content offered by More Music. In response to the user selecting to launch More Music, the graphical user interface 113 displays the new music screen 205.

Figure 3:
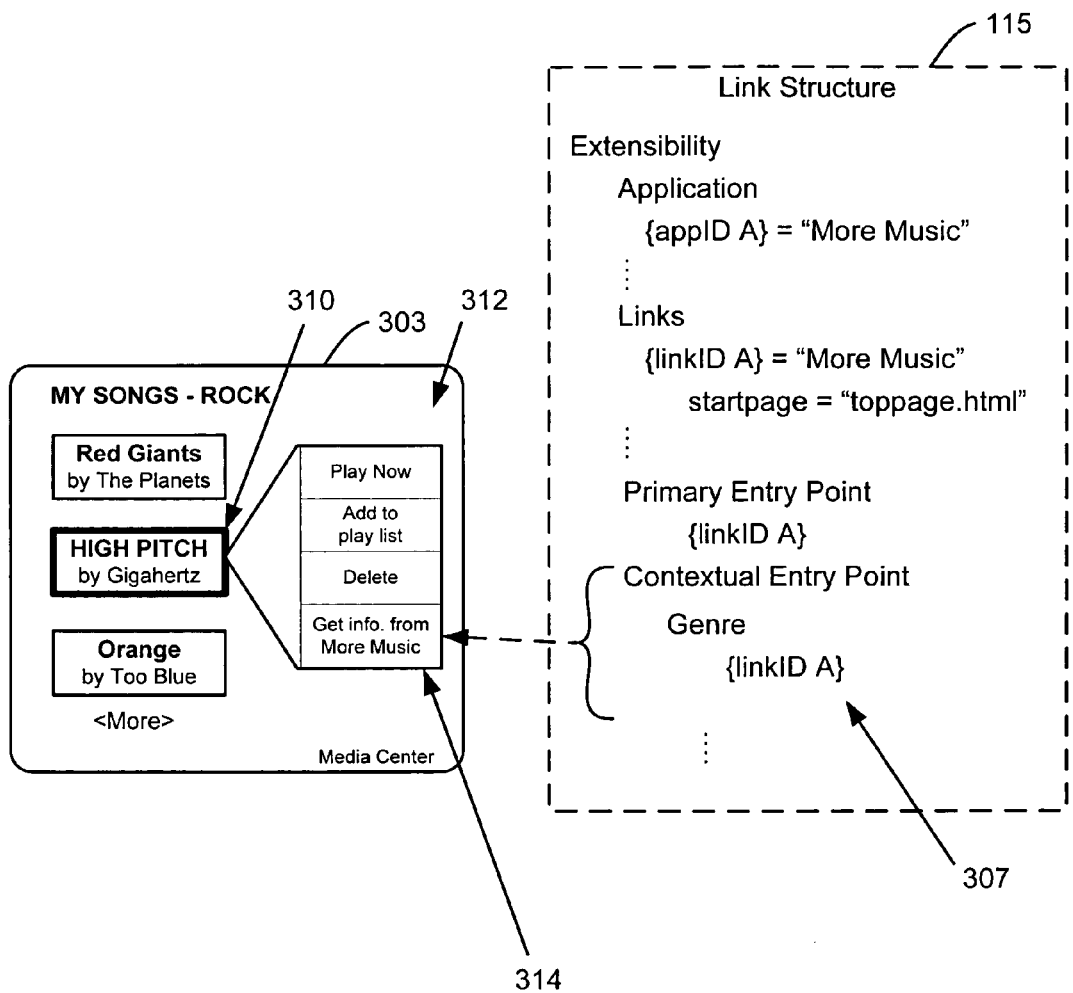
FIG. 3 illustrates an example implementation of a contextual link in the media center module shown in FIG. 1.

FIG. 3 illustrates an example implementation of a contextual link in media center module 110 shown in FIG. 1. The example in FIG. 3 is implemented when the third party application for More Music is registered with media center module 110 and requests to be a context information handler. The data in link structure 115 associated with More Music includes a contextual link 307, which is the entry point for the application for More Music. A third party application may register to be a handler for any context provided by media center module 110. In this example, More Music registers to be a context handler for a context in music. Link structure 115 includes More Music's entry point link for the music genre context. Media center module 110 is thus configured to direct requests for information for music genre to contextual link 307 associated with More Music.

In FIG. 3, an example screen of graphical user interface 113 for media center module 110 is shown to illustrate the use of a contextual link. Screen 303 shows a music page provided by graphical user interface 113 to access music files that are managed by media center module 110. The music files may be organized in accordance with contextual information, such as genre. In this example, screen 303 shows songs (e.g. music files) in the rock genre that are available for user selection. As shown in FIG. 3, song 310 has been selected. Graphical user interface 113 then provides menu 312 to enable the selection of actions available for song 310. One of the selections includes action 314 for retrieving information in the current context of the rock genre. Since More Music registered to be the handler for music genre, the selection of this action causes contextual link 307 to be activated and the direction to a location associated with More Music. Media center module 110 is configured to provide the contextual information to More Music so that More Music can provide information associated with the current context. For example, media center module 110 may provide the contextual information as POST data in an HTTP request. In this example, the contextual information may include the information that the current context is the rock genre. More Music may include a page at the location specified by the contextual link with information related to the rock genre.

It is to be appreciated that a third party application may register to be a handler in multiple context. Also, the contextual information provided by the media center module to the registered third party applications may include any type of data about a media, such as genre, artist, song, album, or the like.

Figure 4:
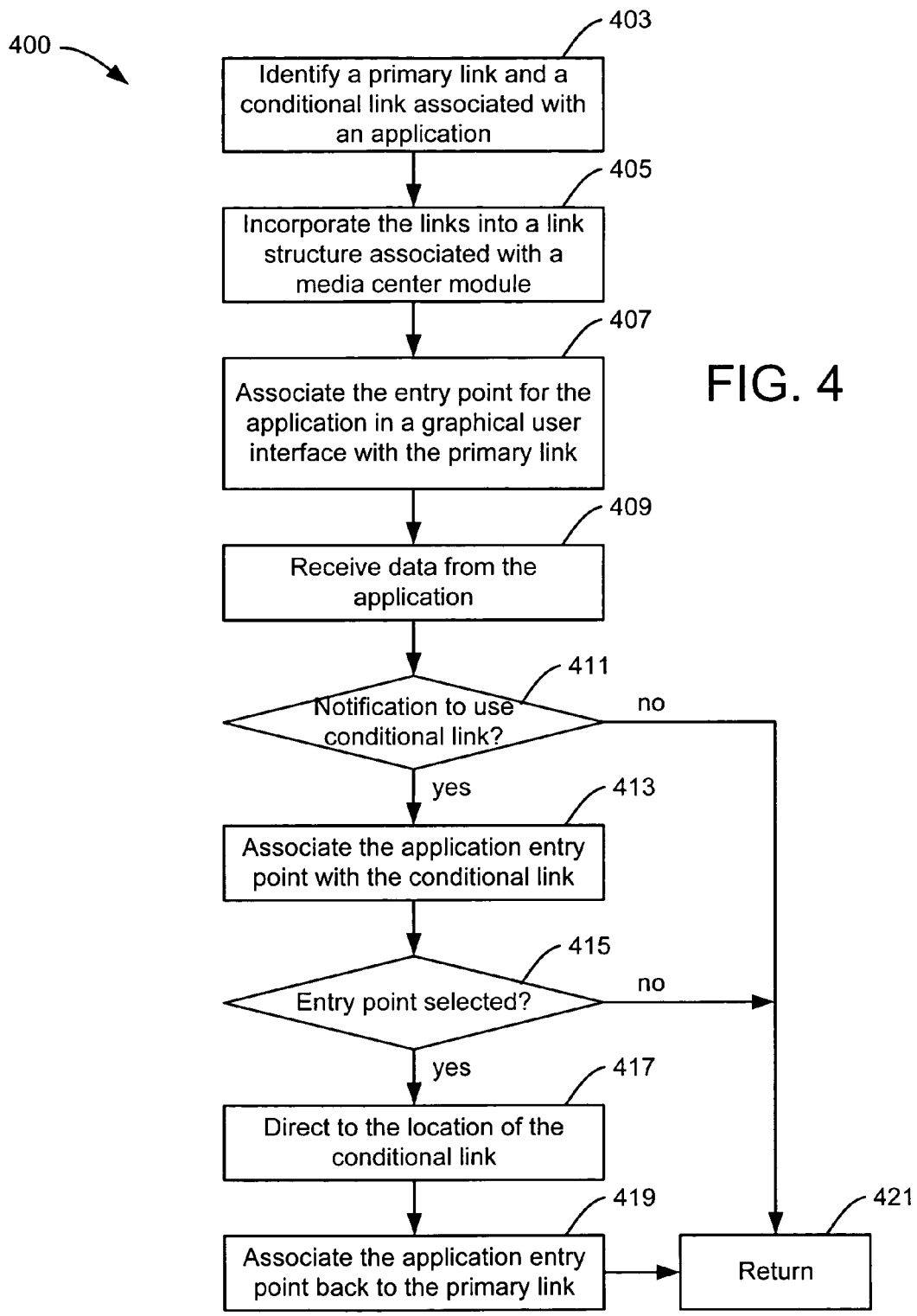
FIG. 4 shows an example process for incorporating a conditional link for navigating to a media application.

FIG. 4 shows an example process 400 for incorporating a conditional link for navigating to a media application. Process 400 may be used by a media center module to enable a third part application to provide a conditional entry point for the application. At block 403, a primary link and a conditional link associated with an application are identified. The primary link serves as the main entry point for launching the third party application and the conditional link is the alternative entry point that is implemented under a certain condition. The links may be provided to the media center module when the third party application registers with the module.

At block 405, the links are incorporated into a link structure associated with the media center module. The link structure includes entries for each application that has registered with the media center module. At block 407, the entry point for the application in a graphical user interface provided by the media center module is associated with the primary link. Thus, a selection of the entry point will cause the media center module to direct to the location indicated by the primary link.

At block 409, data is received from the application by the media center module. The application may provide any type of data to the media center module, such as media content and related information. The application may also provide a notification to the media center module to use a conditional link. For example, the application may be configured to provide some requested media content to the media center module. When the downloading of the media content has been completed, the application may notify the media center module to use the conditional link, which points to the location for accessing the newly downloaded media content.

At block 411, a determination is made whether a notification to use conditional link is provided by the application. If not, process 400 goes to return block 421. If a notification has been provided, process 400 goes to block 413 where the application entry point is associated with the conditional link. At decision block 415, a determination is made whether the application entry point is selected. If not, process 400 goes to return block 421. If the entry point has been selected, process 400 continues at block 417 where the media center module directs to the location indicated by the conditional link. At block 419, the application entry point is associated back to the primary link. Process 400 goes to block 421 where the process is returned to perform other tasks.

Figure 5:
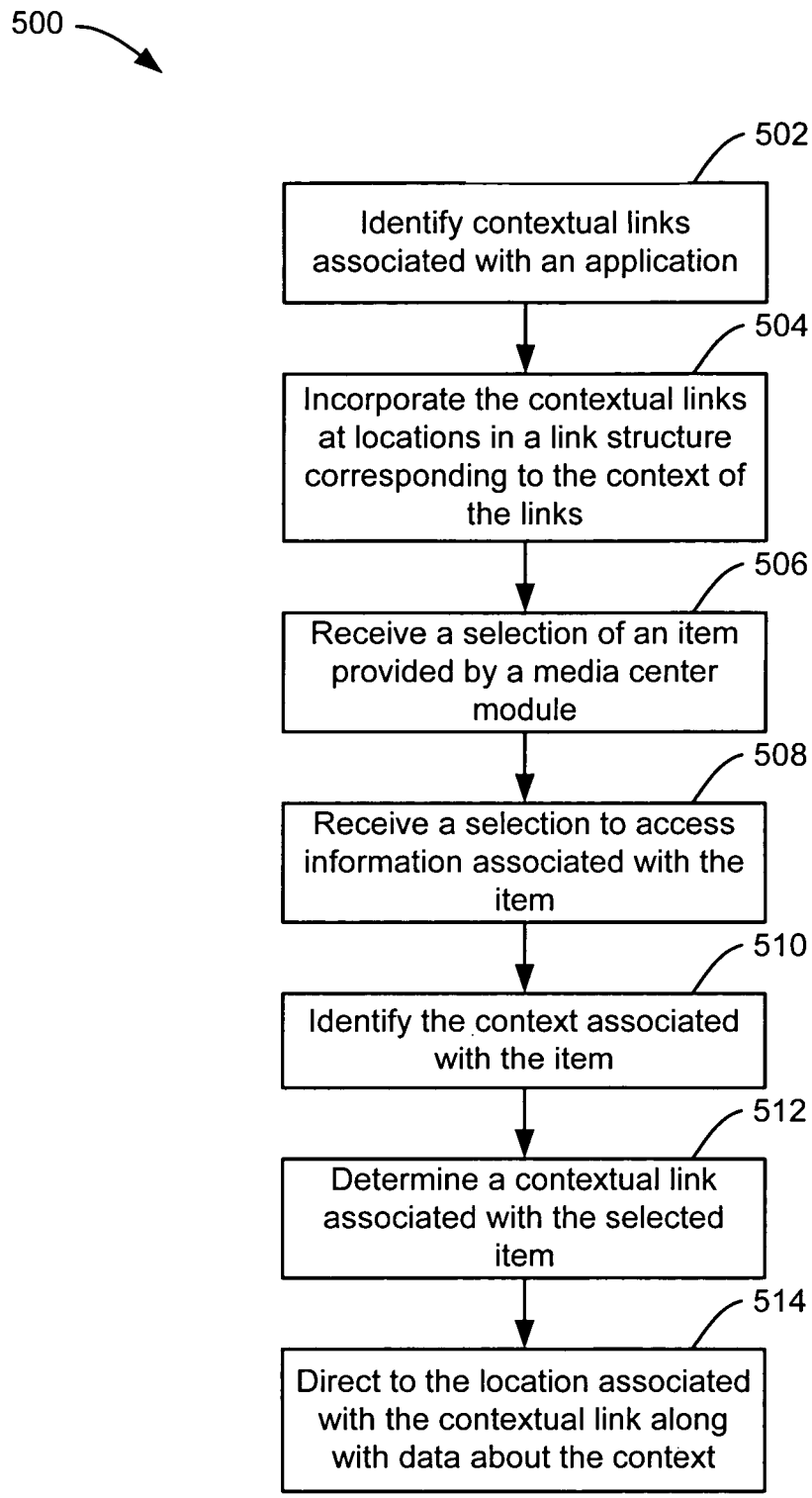
FIG. 5 shows an example process for incorporating contextual links for navigating to a media application.

FIG. 5 shows an example process 500 for incorporating contextual links for navigating to a media application. Process 500 may be used by a media center module to enable a third party application to provide information associated with a context. At block 502, contextual links associated with an application are identified. Each contextual link is related to a specific context and serves as the entry point for the application. The contextual links may be provided to media center module when the application registers with the module as context information handler.

At block 504, the contextual links are incorporated at locations in a link structure corresponding to the contexts of the contextual links. At block 506, a selection of an item provided by the media center module is received. The item may include any media content, such as an audio file, a video file, a document, or the like. At block 508, a selection to access information associated with the item is received. At block 510, the context associated with the item is identified. At block 512, a contextual link associated with the selected item is determined. At block 514, the media center module directs to the location associated with the contextual link. The media center also provides data about the context to the location. For example, the data may be provided as POST data in an HTTP request to the location.

The example code below may be used by a media center module to provide an Application Program Interface (API) for a third party application to registered with the module.

MediaCenter.Registrar
        RegisterApplication(string appGuid, string name, string
            companyName);
        UnregisterApplication(string appGuid);
        RegisterLink(string linkGuid, string name, string
            description, string url,
    string startImage Url, string thumbnailUrl, int capabilities,
        string appGuid);
        UnregisterLink(string linkGuid);
        AssociateLink(string linkGuid, string associationType,
            string category);
        DisassociateLink(string linkGuid, string association-
            Type, string category);

The example code below may be used by a third party application to interact with the API of the media center module shown above.

reg = MediaCenter.Registrar;
    string installDir = "file://c:\Program Files\FooBar Inc\MoreMusic";
    // Registering an extensibility application:
    string myAppGuid = "{e9dc1cb5-5b17-4b21-bd66-5e0c2efe8175}";
    reg.RegisterApplication(myAppGuid, "MoreMusic", "FooBar, Inc.");
    // Registering a link:
    string myLinkGuid = "{c1bc45e2-c4d8-4226-a44f-a2bf38532618}";
    reg.RegisterLink(
        myLinkGuid,
        "MoreMusic",
        "MoreMusic is your one-stop shop for all music, all the time.",
        installDir + "home.htm",

```
            installDir + "startimage.png",
            installDir + "thumbnail.png",
            0,
            myAppGuid);
    // Associating a link with various places within Media Center:
    reg.AssociateLink(myLinkGuid, "Programs", "");
    reg.AssociateLink(myLinkGuid, "MoreWithThis",
    "Artist,Album,Song,Genre");
    reg.AssociateLink(myLinkGuid, "Services", "Music,Radio");
    // Registering and associating a "new for me" link:
    string myNewLinkGuid = "{7abeaef5-2839-4c30-a8dd-a6168aa37db4}";
    reg.RegisterLink(
            myNewLinkGuid,
            "New albums available from MoreMusic",
            "MoreMusic has some new albums you might be interested in
    purchasing.",
            installDir + "newforme.htm",
            installDir + "startimage.png",
            installDir + "thumbnail.png",
            0,
            myAppGuid);
    reg.AssociateLink(myNewLinkGuid, "NewForMe", "");
    // Removing a "new for me" link (unregisters and removes
    associations):
    reg.UnregisterLink(myNewLinkGuid);
    // Removing the whole application (unregisters app plus all
    its links and
    associations):
    reg.UnregisterApplication(myAppGuid);
```

The example code below may be incorporated in an extensible markup language (XML) file that serves as input to the API shown above.

```
<application
        appGuid="{e9dc1cb5-5b17-4b21-bd66-5e0c2efe8175}"
        name="MoreMusic"
        companyName="FooBar, Inc.">
    <link
            linkGuid="{c1bc45e2-c4d8-4226-a44f-a2bf38532618}"
            name="MoreMusic"
            description="MoreMusic is your one-stop shop for all
            music, all the time."
            url=".\home.html";
            startImageUrl=".\startimage.png"
            thumbnailUrl=".\thumbnail.png"
            capabilities="0">
        <association type="Programs" />
        <association type="MoreWithThis"
        category="Artist,Album,Song,Genre" />
        <association type="Services"
        category="Artist,Album,Song,Genre" />
    </link>
    <link>
            linkGuid="{7abeaef5-2839-4c30-a8dd-a6168aa37db4}"
            name="New albums available from MoreMusic"
            description="MoreMusic has some new albums you might
            be interested in
purchasing."
            url=".\newforme.html";
            startImageUrl=".\MoreMusic\startimage.png"
            thumbnailUrl=".\MoreMusic\thumbnail.png"
            capabilities="0">
        <association type="NewForMe" />
    </link>
</application>
```

Figure 6:
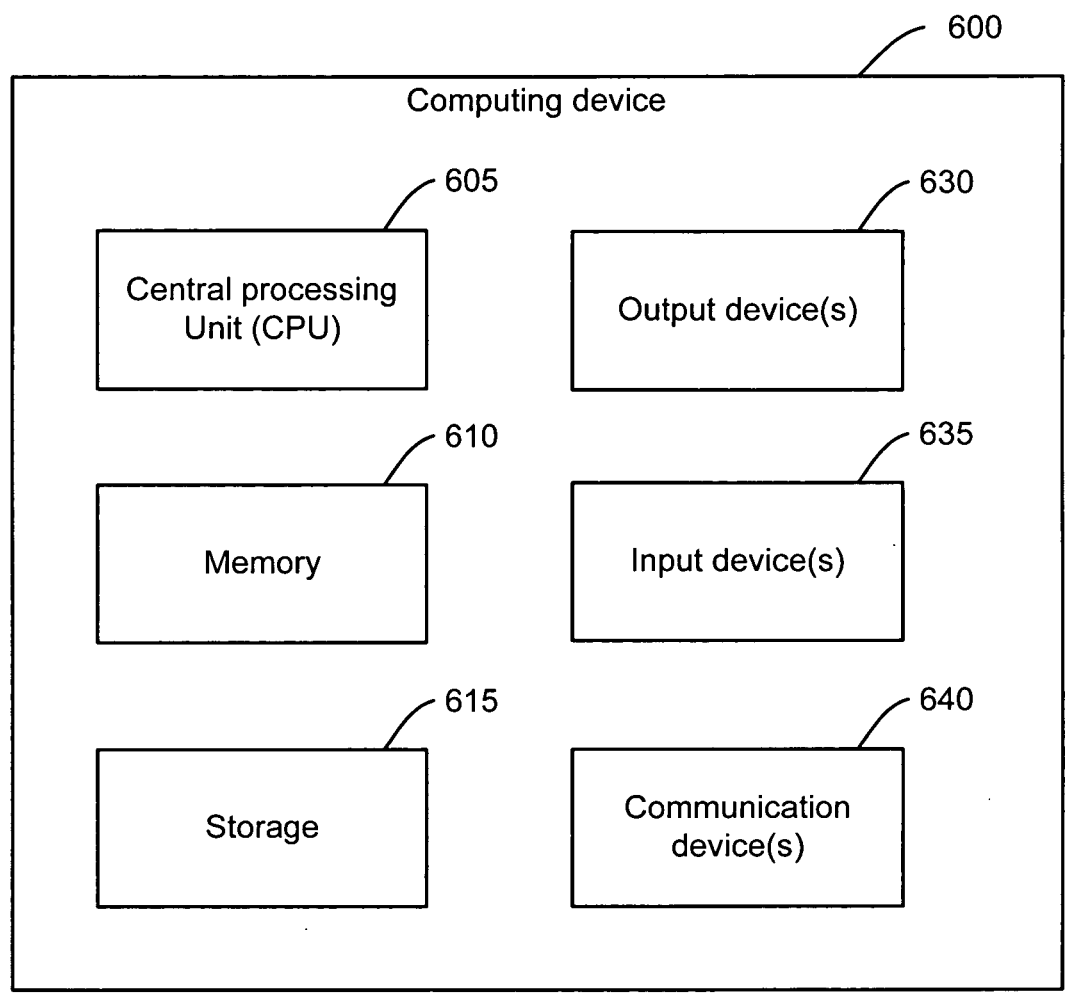
FIG. 6 shows an exemplary computer device for implementing the described systems and methods.

FIG. 6 shows an exemplary computer device 600 for implementing the described systems and methods. In its most basic configuration, computing device 600 typically includes at least one central processing unit (CPU) 605 and memory 610.

Depending on the exact configuration and type of computing device, memory 610 may be volatile (such as RAM), non-volatile (such as ROM, flash memory, etc.) or some combination of the two. Additionally, computing device 600 may also have additional features/functionality. For example, computing device 600 may include multiple CPU's. The described methods may be executed in any manner by any processing unit in computing device 600. For example, the described process may be executed by both multiple CPU's in parallel.

Computing device 600 may also include additional storage (removable and/or non-removable) including, but not limited to, magnetic or optical disks or tape. Such additional storage is illustrated in FIG. 6 by storage 615. Computer storage media includes volatile and nonvolatile, removable and non-removable media implemented in any method or technology for storage of information such as computer readable instructions, data structures, program modules or other data. Memory 610 and storage 615 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also contain communications device(s) 640 that allow the device to communicate with other devices. Communications device(s) 640 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 600 may also have input device(s) 635 such as keyboard, mouse, pen, voice input device, touch input device, etc. Output device(s) 630 such as a display, speakers, printer, etc. may also be included. All these devices are well know in the art and need not be discussed at length.

While the preferred embodiment of the invention has been illustrated and described, it will be appreciated that various changes can be made therein without departing from the spirit and scope of the invention.

The invention claimed is:

1. Storage hardware encoded with device-executable instructions which, when executed by at least one processing unit, cause the at least one processing unit to perform:
    registering, with a media center module, a third party media application to provide user access to media content items, the registering comprising:
        storing a primary link associated with a main entry point to the third party media application, the primary link identifying program codes stored locally with the media center module; and
        storing a conditional link associated with a conditional entry point to the third party media application, the conditional link identifying other program codes stored remotely from the media center module;

determining whether a third party notification to use the conditional link is received from the third party media application via a device associated with the third party media application;

receiving a request to access the third party media application; and responsive to the request:

selecting the conditional entry point when the third party notification to use the conditional link has been received, and otherwise selecting the main entry point;

launching the third party media application via the program codes stored locally with the media center module when the main entry point is selected; and launching the third party media application via the other program codes stored remotely from the media center module and identified by the conditional link when the third party notification is received and the conditional entry point is selected.

2. The storage hardware as recited in claim 1, wherein the other program codes comprise HyperText Markup Language code.

3. The storage hardware as recited in claim 1, wherein the program codes identified by the primary link are stored in a local file, and the other program codes identified by the conditional link are included in a web page.

4. The one or more storage hardware as recited in claim 1, wherein the third party notification indicates that a first media item is newly available via a network location associated with the conditional link.

5. The storage hardware as recited in claim 1, wherein the request to access the third party media application comprises a request to launch the third party media application.

6. The storage hardware as recited in claim 1, wherein the content items are music items.

7. The storage hardware as recited in claim 1, embodied as one or more memory devices, optical storage devices, or magnetic storage devices.

8. The storage hardware as recited in claim 1, further comprising device-executable instructions which, when executed by the at least one processing unit, cause the at least one processing unit to perform:

accessing a newly-available media content item via the other program codes identified by the conditional link; and accessing other media content items that are not newly available via the program codes stored locally with the media center module.

9. A method comprising:

registering a third party media application with a media center module on a computing device, the third party media application providing user access to media content items, the registering comprising:

storing a primary link associated with a main entry point to the third party media application, the primary link identifying a local location on the computing device; and storing a conditional link associated with a conditional entry point to the third party media application, the conditional link identifying a remote location that is remote from the computing device;

determining, by the computing device, that a third party notification to use the conditional link is received from the third party media application via a network server associated with the third party media application;

selecting, by the computing device, the conditional entry point instead of the main entry point based on the determination that the third party notification to use the conditional link has been received;

receiving, by the computing device, a request to access the third party media application; and responsive to receiving the request, launching, by the computing device, the third party application via the remote location identified by the conditional link.

10. The method as recited in claim 9, wherein the remote location identified by the conditional link provides markup language code to the third party media application when the remote location is accessed.

11. The method as recited in claim 10, wherein the markup language code comprises a HyperText Markup Language page.

12. The method as recited in claim 9, wherein the primary link identifies a local file, and the conditional link identifies a network address or a web page.

13. The method as recited in claim 9, wherein the remote location identified by the conditional link aggregates notifications of new content.

14. A system comprising:

at least one processing unit; and storage hardware storing computer readable instructions which, when executed by the at least one processing unit, cause the at least one processing unit to perform:

registering a third party media application to provide user access to media content items, the third party media application being registered by storing a primary link associated with the third party media application and a conditional link associated with the third party media application, wherein the primary link identifies local code stored locally on the system and the conditional link identifies remote code stored remotely from the system;

determining whether a third party notification to use the conditional link is received from the third party media application via a remote third party provider service;

receiving a request to access the third party media application; and responsive to the request:

selecting the conditional link in instances when the third party notification has been received and selecting the primary link in other instances when the third party notification has not been received;

launching the third party media application via the local code when the primary link is selected; and launching the third party media application via the remote code when the conditional link is selected.

15. The system according to claim 14, wherein the media content items include audio files, video files, or documents.

16. The system according to claim 14, wherein the third party notification indicates that new media items are available from the third party media application.

17. The system according to claim 14, wherein the computer readable instructions cause the at least one processing unit to perform:

directing a user of the third party media to a location for accessing new content, the location storing the remote code.

18. The system according to claim 14, wherein the computer readable instructions cause the at least one processing unit to perform:

providing an application program interface (API) to the third party media application, the API including:

a first function configured to register the third party media application;

a second function configured to unregister the third party media application;

a third function configured to register the conditional link; and a fourth function configured to unregister the conditional link.

19. The system according to claim 18, wherein the computer readable instructions cause the at least one processing unit to perform:

storing the conditional link responsive to a call by the third party media application to the third function.

20. The storage hardware as recited in claim 1, wherein the registering comprises:

receiving, from the third party media application, an extensible markup language (XML) file identifying the conditional link.

* * * * *